(12) United States Patent
Jung et al.

(10) Patent No.: US 10,684,520 B2
(45) Date of Patent: *Jun. 16, 2020

(54) DISPLAY DEVICE AND MANUFACTURING METHOD THEREOF

(71) Applicant: SAMSUNG DISPLAY CO., LTD., Yongin-si, Gyeonggi-do (KR)

(72) Inventors: Yangho Jung, Seoul (KR); Chulwon Park, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,535

(22) Filed: Dec. 3, 2018

(65) Prior Publication Data
US 2019/0113815 A1 Apr. 18, 2019

Related U.S. Application Data

(63) Continuation of application No. 15/337,420, filed on Oct. 28, 2016, now Pat. No. 10,180,609.

(30) Foreign Application Priority Data

Jan. 6, 2016 (KR) .......................... 10-2016-0001747

(51) Int. Cl.
G02F 1/1335 (2006.01)
G02F 1/1339 (2006.01)
(Continued)

(52) U.S. Cl.
CPC ...... *G02F 1/136209* (2013.01); *G02F 1/1368* (2013.01); *G02F 1/13394* (2013.01);
(Continued)

(58) Field of Classification Search
CPC ...... G02F 1/1333; G02F 1/1335; G02F 1/136; G02F 1/136286; G02F 1/133512;
(Continued)

(56) References Cited

U.S. PATENT DOCUMENTS 10,180,609 B2 * 1/2019 Jung ................. G02F 1/133345
2009/0147208 A1 6/2009 Tatemori et al.
(Continued)

FOREIGN PATENT DOCUMENTS

KR 1020070105457 A 10/2007
KR 1020090060159 A 6/2009
(Continued)

Primary Examiner — Thoi V Duong
(74) Attorney, Agent, or Firm — Cantor Colburn LLP

(57) ABSTRACT

A display device includes: a first substrate; a gate line on the first substrate, where the gate line extends in a first direction; a data line on the first substrate, where the data line extends in a second direction which intersects the first direction; a thin film transistor connected to the gate line and the data line; a passivation layer on the gate line, the data line and the thin film transistor, where the passivation layer includes a recessed portion; a light blocking portion on the recessed portion of the passivation layer; a main column spacer which protrudes upwardly from the light blocking portion; and a sub-column spacer which protrudes upwardly from the light blocking portion, where the sub-column spacer is spaced apart from the main column spacer.

12 Claims, 11 Drawing Sheets

(51) Int. Cl.
*G02F 1/1362* (2006.01)
*G02F 1/1333* (2006.01)
*G02F 1/1368* (2006.01)

(52) U.S. Cl.
CPC .. *G02F 1/133345* (2013.01); *G02F 1/133512* (2013.01); *G02F 1/136286* (2013.01); *G02F 2001/13396* (2013.01); *G02F 2001/13398* (2013.01); *G02F 2001/13625* (2013.01); *G02F 2001/136222* (2013.01)

(58) Field of Classification Search
CPC ............. G02F 1/133514; G02F 1/1368; G02F 1/133345; G02F 1/1339; G02F 1/13394; G02F 1/136209; G02F 1/136227; G02F 1/1362; G02F 2001/136222; G02F 2001/13625; G02F 2001/1351; G02F 2001/13398; G02F 2001/13396; G02F 2201/52; G02F 2201/122; H01L 51/4284; H01L 27/1214; H01L 27/3272; H01L 27/3211; H01L 27/3262; H01L 27/14621; H01L 27/14623

See application file for complete search history.

(56) References Cited

U.S. PATENT DOCUMENTS

2012/0038867 A1 2/2012 Kwon et al.
2013/0314652 A1 11/2013 Ryu et al.
2013/0329155 A1 12/2013 Kwak et al.

FOREIGN PATENT DOCUMENTS

KR  1020130013110 A   2/2013
KR  1020130131969 A  12/2013
KR  1020130137457 A  12/2013

* cited by examiner

DISPLAY DEVICE AND MANUFACTURING METHOD THEREOF

This application is a continuation of U.S. patent application Ser. No. 15/337,420, filed on Oct. 28, 2016, which claims priority to Korean Patent Application No. 10-2016-0001747, filed on Jan. 6, 2016, and all the benefits accruing therefrom under 35 U.S.C. § 119, the content of which in its entirety is herein incorporated by reference.

BACKGROUND

1. Field

Exemplary embodiments of the invention relate to a display device and a manufacturing method thereof, and more particularly, to a display device including a light blocking portion at a recessed portion of a passivation layer and a manufacturing method thereof.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme thereof.

Among the types of the display devices, an LCD device includes two substrates opposing each other, an electrode on at least one of the two substrates, and a liquid crystal layer between the two substrates.

The LCD device typically includes a plurality of thin film transistors and a pixel electrode on one of the two substrates and a plurality of color filters, a light blocking portion, and a common electrode on the other of the two substrates. Recently, a display device having a color filter on array ("COA") structure, in which a color filter, a light blocking portion, a pixel electrode, and the like, except a common electrode, are formed on a single substrate, has been researched. In addition, a display device having a black column spacer structure, in which a column spacer, configured to maintain a cell gap uniform between the two substrates, is formed integrally with the light blocking portion to simplify a process, has been researched.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments of the invention are directed to a display device including a light blocking portion in a recessed surface area of a passivation layer.

Exemplary embodiments of the invention are directed to a display device in which a main column spacer and a sub-column spacer are formed integrally with the light blocking portion as a unitary unit.

Further, exemplary embodiments of the invention are directed to a display device in which the light blocking portion has a highly precise pattern, a thickness thereof is readily secured, and a height difference between a main column spacer and a sub-column spacer is readily imparted, and to a method of manufacturing the display device.

According to an exemplary embodiment of the invention, a display device includes: a first substrate; a gate line on the first substrate, where the gate line extends in a first direction; a data line on the first substrate, where the data line extends in a second direction which intersects the first direction; a thin film transistor connected to the gate line and the data line; a passivation layer on the gate line, the data line, and the thin film transistor, where the passivation layer includes a recessed portion; a light blocking portion on the recessed portion of the passivation layer; a main column spacer which protrudes in a third direction from the light blocking portion, where the third direction is perpendicular to the first and second directions; and a sub-column spacer which protrudes in the third direction from the light blocking portion, where the sub-column spacer is spaced apart from the main column spacer.

In an exemplary embodiment, the main column spacer may have a height greater than a height of the sub-column spacer with respect to a surface of the light blocking portion.

In an exemplary embodiment, the light blocking portion, the main column spacer, and the sub-column spacer may include a same material as each other.

In an exemplary embodiment, the recessed portion may have a depth in a range of about 10 percent (%) to about 200% of a thickness of the light blocking portion.

In an exemplary embodiment, the light blocking portion may have a thickness in a range of about 0.5 micrometer (μm) to about 2.5 μm.

In an exemplary embodiment, at least a portion of the recessed portion may overlap at least one of the gate line and the data line.

In an exemplary embodiment, at least one of the main column spacer and the sub-column spacer may overlap the thin film transistor.

In an exemplary embodiment, the display device may further include a first color filter and a second color filter, which are between the first substrate and the passivation layer, where the second color filter has a color different from a color of the first color filter. In such an embodiment, the first color filter and the second color filter may overlap each other in a border area of the first color filter and the second color filter, and at least a portion of the recessed portion may be defined to overlap the border area in which the first color filter and the second color filter overlap each other.

In an exemplary embodiment, the display device may further include a second substrate on the light blocking portion to oppose the first substrate; and a liquid crystal layer between the first substrate and the second substrate.

According to another exemplary embodiment of the invention, a display device includes: a first substrate; a first color filter on the first substrate; a second color filter on the first substrate, where the second color filter has a color different from a color of the first color filter; a passivation layer on the first color filter and the second color filter, where the passivation layer includes a recessed portion; and a light blocking portion on the recessed portion of the passivation layer. In such an embodiment, the first color filter and the second color filter overlaps each other in a border area thereof, and at least a portion of the recessed portion overlaps the border area in which the first color filter and the second color filter overlap each other.

In an exemplary embodiment, the recessed portion may have a depth in a range of about 10% to about 200% of a thickness of the light blocking portion.

In an exemplary embodiment, the display device may further include a gate line between the first substrate and the passivation layer, where the gate line extends in a first direction; a data line between the first substrate and the passivation layer, where the data line extends in a second direction which intersects the first direction; and a thin film transistor connected to the gate line and the data line. In such an embodiment, at least a portion of the recessed portion may overlap at least one of the gate line and the data line.

In an exemplary embodiment, the display device may further include a main column spacer which protrudes in a third direction from the light blocking portion, where the third direction is perpendicular to the first and second directions; and a sub-column spacer which protrudes in the third direction from the light blocking portion, where the sub-column spacer is spaced apart from the main column spacer.

In an exemplary embodiment, the main column spacer may be disposed to overlap the thin film transistor.

According to another exemplary embodiment of the invention, a method of manufacturing a display device includes: providing a thin film transistor on the first substrate; providing a passivation layer on the thin film transistor, where the passivation layer includes a recessed portion; providing a light blocking portion on the recessed portion of the passivation layer; and providing a main column spacer and a sub-column spacer on the light blocking portion, where the main column spacer protrudes upwardly from the light blocking portion, and the sub-column spacer protrudes upwardly from the light blocking portion and is spaced apart from the main column spacer.

In an exemplary embodiment, the providing the passivation layer may include: coating a first photosensitive composition on the thin film transistor; disposing a first exposure mask on the first photosensitive composition and irradiating light to the first photosensitive composition through the first exposure mask; and developing the first photosensitive composition after the irradiating the light thereto. In such an embodiment, the first exposure mask may include a transmissive pattern, a semi-transmissive pattern, and a blocking pattern.

In an exemplary embodiment, the providing the light blocking portion and the forming of the main column spacer and the sub-column spacer may be carried out in a same process.

In an exemplary embodiment, the providing the light blocking portion, and the providing the main column spacer and the sub-column spacer may include: coating a second photosensitive composition on the passivation layer; disposing a second exposure mask on the second photosensitive composition and irradiating light to the second photosensitive composition through the second exposure mask; and developing and curing the second photosensitive composition after the irradiating the light thereto. In such an embodiment, the second exposure mask may include a transmissive pattern, a first semi-transmissive pattern, a second semi-transmissive pattern, and a blocking pattern.

In an exemplary embodiment, the method may further include providing a color filter on the first substrate before the providing the passivation layer.

In an exemplary embodiment, the providing the color filter may include: providing a first color filter on the first substrate; and providing a second color filter on the first substrate, where the second color filter has a color different from a color of the first color filter. In such an embodiment, the first color filter and the second color filter may overlap each other in a border area thereof, and at least a portion of the recessed portion may be provided to overlap the border area in which the first color filter and the second color filter overlap each other.

In an exemplary embodiment, the providing the thin film transistor may include: providing a gate line on the first substrate, where the gate line extends in a first direction and connected to the thin film transistor; and providing a data line on the first substrate, where the data line extends in a second direction which intersects the first direction and is connected to the thin film transistor. In such an embodiment, at least a portion of the recessed portion may overlap at least one of the data line and the gate line.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
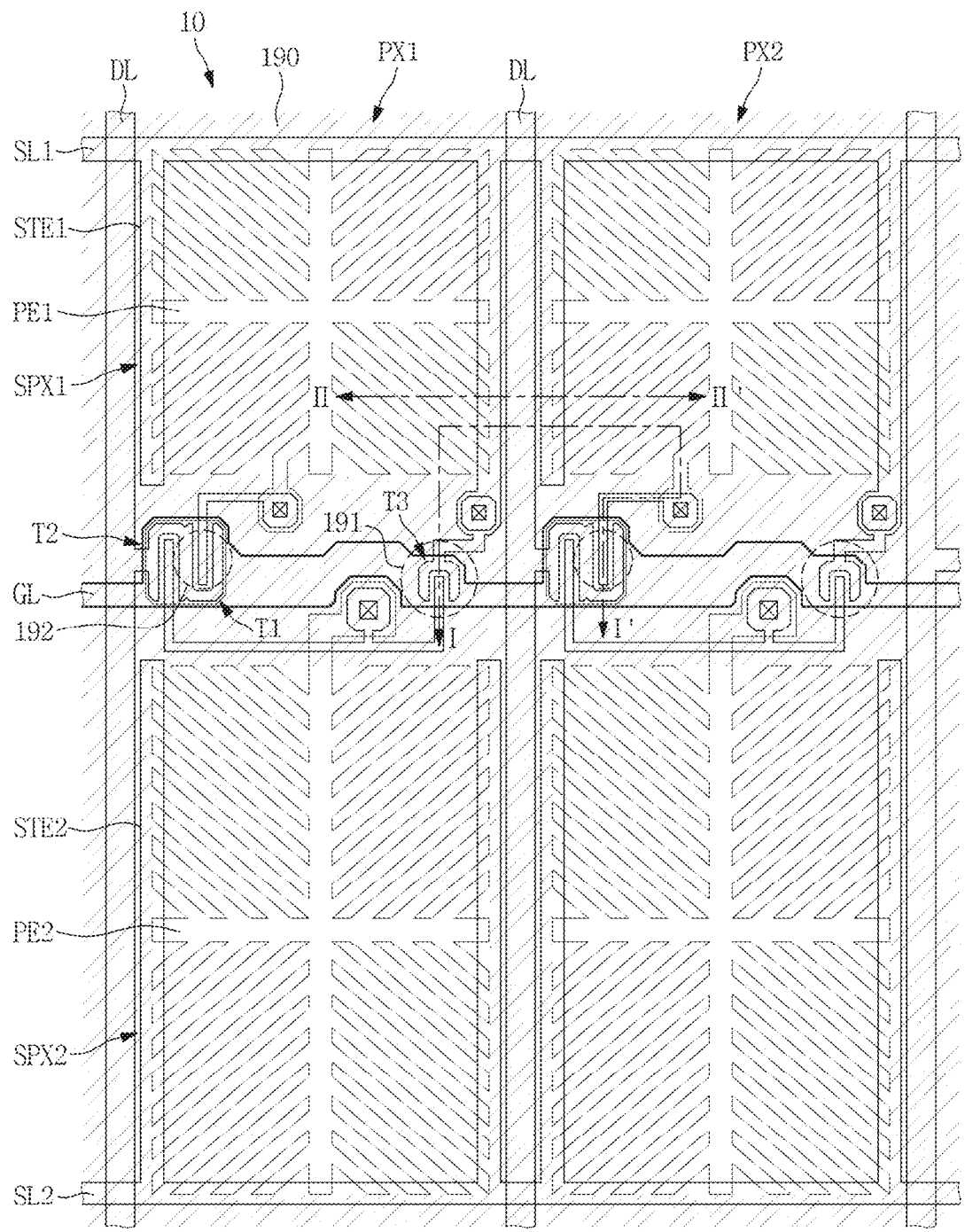
FIG. 1 is a plan view illustrating an exemplary embodiment of a display device.

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, certain elements or shapes may be illustrated in an enlarged manner or in a simplified manner to better illustrate the invention, and other elements present in an actual product may also be omitted. Thus, the drawings are intended to facilitate the understanding of the present invention.

When a layer, area, or plate is referred to as being "on" another layer, area, or plate, it may be directly on the other layer, area or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present invention, and like reference numerals refer to like elements throughout the specification.

Hereinafter, an exemplary embodiment of a display device will be described with reference to FIGS. 1, 2, 3, and 4.

Figure 2:
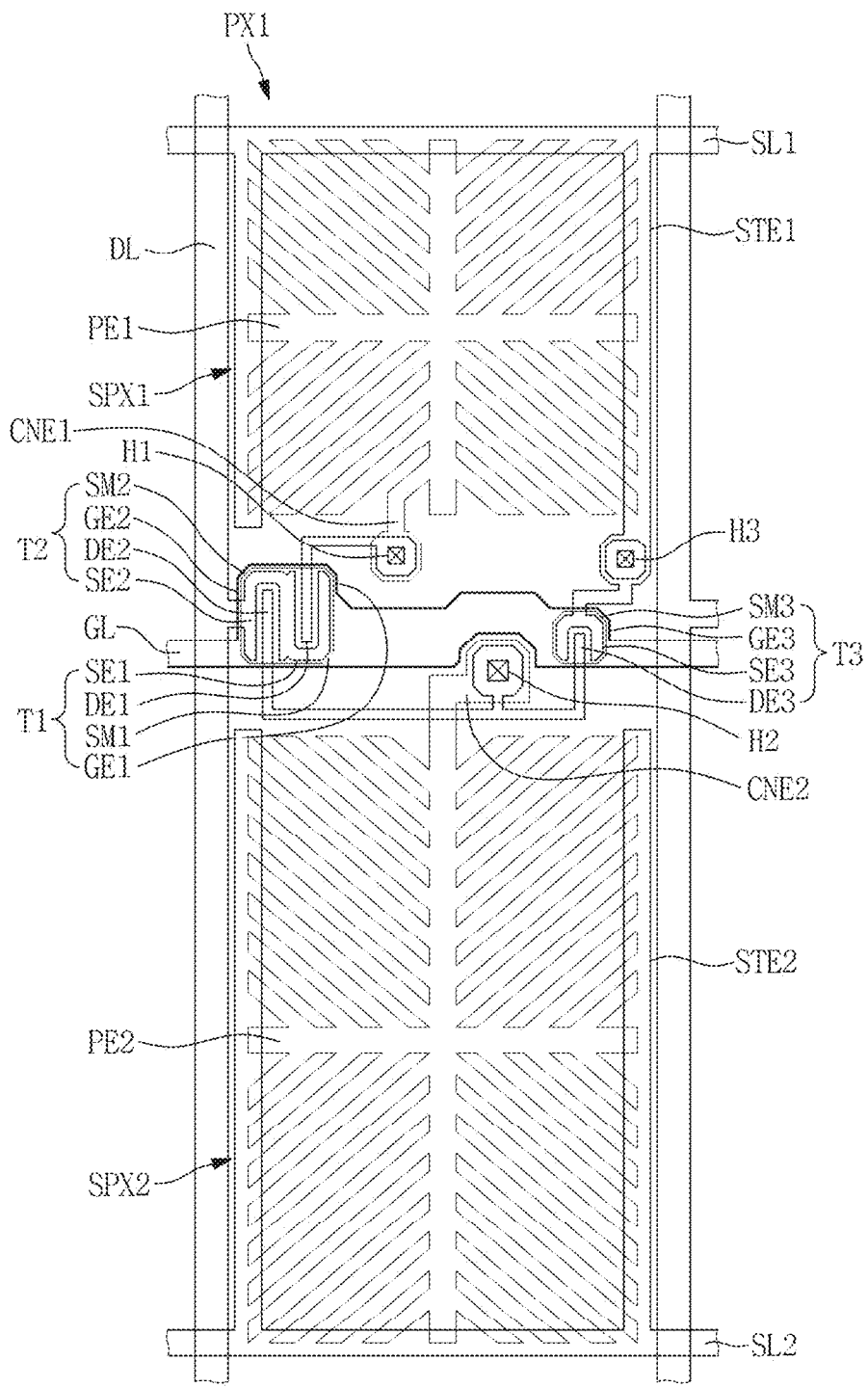
FIG. 2 is a plan view illustrating an exemplary embodiment of a pixel of FIG. 1.
Figure 3:
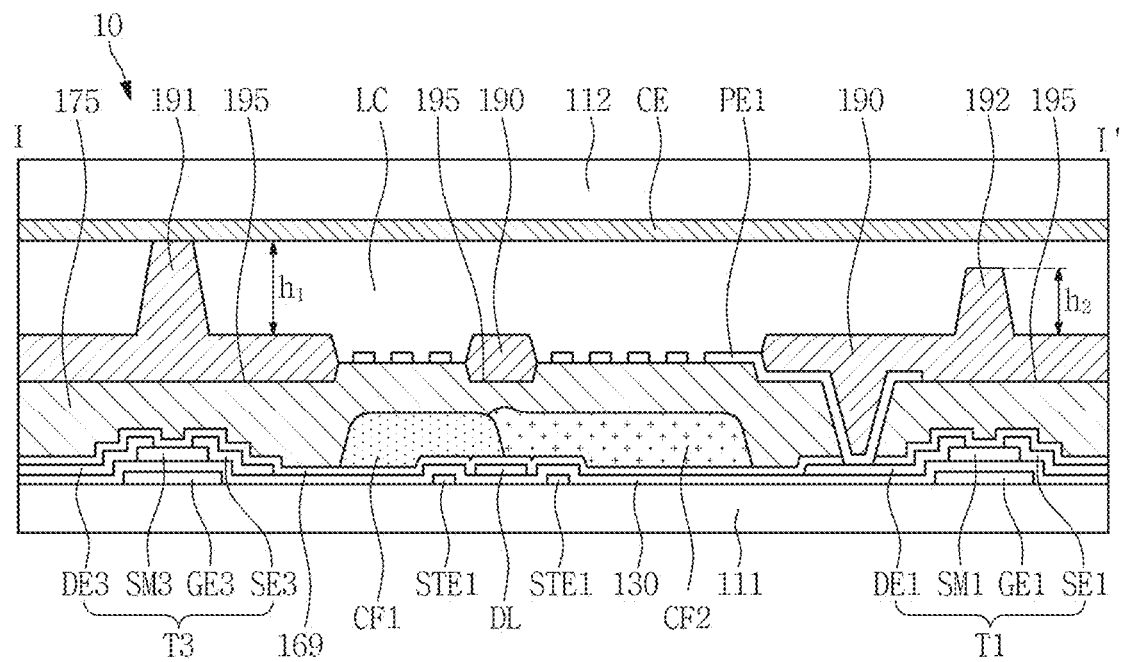
FIG. 3 is a cross-sectional view taken along line I-I' of FIG. 1.
Figure 4:
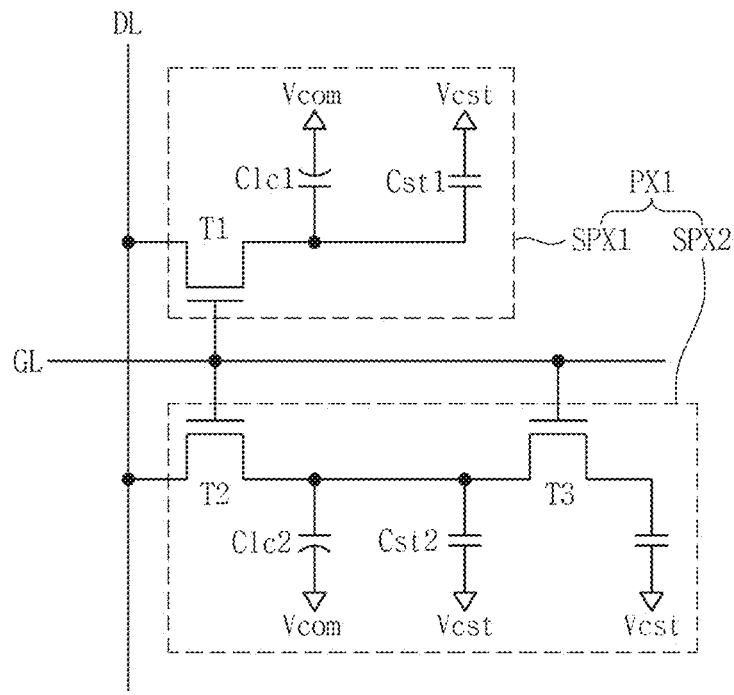
FIG. 4 is an equivalent circuit diagram illustrating the pixel of FIG. 2.
Figure 5:
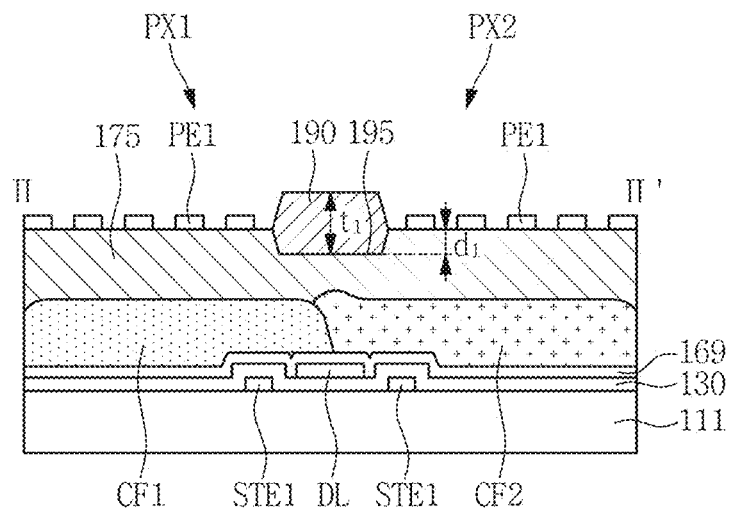
FIG. 5 is a cross-sectional view taken along line II-IP of FIG. 1.

FIG. 1 is a plan view illustrating an exemplary embodiment of a display device, FIG. 2 is a plan view illustrating an exemplary embodiment of a pixel of FIG. 1, FIG. 3 is a cross-sectional view taken along line I-I' of FIG. 1, FIG. 4 is an equivalent circuit diagram illustrating the pixel of FIG. 2, and FIG. 5 is a cross-sectional view taken along line II-II' of FIG. 1.

An exemplary embodiment of the display device 10 may be a liquid crystal display ("LCD") device. In such an embodiment, as shown in FIG. 3, the display device 10 includes a first substrate 111, a second substrate 112 opposing the first substrate 111, and a liquid crystal layer LC between the first substrate 111 and the second substrate 112.

However, the scope of the invention is not limited to the LCD device. In one alternative exemplary embodiment, for example, to the display device is an organic light emitting diode ("OLED") device. For ease of description, exemplary embodiments, where the display device is an LCD device, will hereinafter be described in detail.

The display device 10 includes a plurality of pixels PX1 and PX2 on the first substrate 111. Hereinafter, a configuration of one of the pixels, for example, the pixel PX1, will be described for ease of description.

Referring to FIGS. 1 and 2, the pixel PX1 is connected to a gate line GL and a data line DL. The gate line GL extends in a first direction, and the data line DL extends in a second direction which intersects the first direction. In FIGS. 1 and 2, the first direction corresponds to a transverse or horizontal direction, and the second direction corresponds to a longitudinal or vertical direction.

The pixel PX1 includes a first sub-pixel SPX1 and a second sub-pixel SPX2. The first sub-pixel SPX1 includes a first thin film transistor T1, a first pixel electrode PE1, and a first storage electrode STE1. The second sub-pixel SPX2 includes a second thin film transistor T2, a second pixel electrode PE2, a second storage electrode STE2, and a third thin film transistor T3.

The first sub-pixel SPX1 may be referred to as a high pixel, and the second sub-pixel SPX2 may be referred to as a low pixel.

In an exemplary embodiment, as shown in FIG. 1, the gate line GL, extending in the transverse direction, and the first, second and third thin film transistors T1, T2 and T3 may be disposed in a border area of subpixels in a pixel or an area between the first pixel electrode PE1 and the second pixel electrode PE2 that are adjacent to each other. The data line DL, extending in the longitudinal direction, may be disposed in a border area between two adjacent pixels, e.g., an area between first sub-pixels SPX1 of the two adjacent pixels and between second sub-pixels SPX2 of the two adjacent pixels. The gate line GL may intersect the data line DL.

The first thin film transistor T1 of the first sub-pixel SPX1 includes a first gate electrode GE1 branching off from the gate line GL, a first semiconductor layer SM1 overlapping the first gate electrode GE1, a first source electrode SE1 branching off from the data line DL and overlapping the first semiconductor layer SM1, and a first drain electrode DE1 spaced apart from the first source electrode SE1 and overlapping the first semiconductor layer SM1. The first drain electrode DE1 is connected to the first pixel electrode PE1. In one exemplary embodiment, for example, the first drain electrode DE1 extends toward the first pixel electrode PE1 and is electrically connected to a first connecting electrode CNE1, which branches off from the first pixel electrode PE1, through a first contact hole H1.

The first storage electrode STE1 is connected to a first storage line SL1 which extends in the first direction. The first pixel electrode PE1 overlaps portions of the first storage line SL1 and the first storage electrode STE1, thus forming a first storage capacitor Cst1. The first storage electrode STE1 receives a storage voltage.

The second thin film transistor T2 of the second sub-pixel SPX2 includes a second gate electrode GE2 branching off from the gate line GL, a second semiconductor layer SM2 overlapping the second gate electrode GE2, a second source electrode SE2 branching off from the data line DL and overlapping the second semiconductor layer SM2, and a second drain electrode DE2 spaced apart from the second source electrode SE2 and overlapping the second semiconductor layer SM2. The second drain electrode DE2 is connected to the second pixel electrode PE2. In one exemplary embodiment, for example, the second drain electrode DE2 extends toward the second pixel electrode PE2, and is electrically connected to a second connecting electrode CNE2, which branches off from the second pixel electrode PE2, through a second contact hole H2.

The third thin film transistor T3 of the second sub-pixel SPX2 includes a third gate electrode GE3 branching off from the gate line GL, a third source electrode SE3 electrically connected to the first storage electrode STE1 through a third contact hole H3, a third drain electrode DE3 extending from the second drain electrode DE2, and a third semiconductor layer SM3. The third source electrode SE3 and the first storage electrode STE1 are electrically connected to each other through a third contact hole H3, and the third drain electrode DE3 is electrically connected to the second pixel electrode PE2 through the second contact hole H2.

In an alternative exemplary embodiment, the third gate electrode GE3 may branch off from a separate decompression gate line (not illustrated).

The second storage electrode STE2 is connected to a second storage line SL2 which extends in the first direction. The second pixel electrode PE2 overlaps portions of the second storage line SL2 and the second storage electrode STE2, thus forming a second storage capacitor Cst2. The second storage electrode STE2 receives the storage voltage.

The first thin film transistor T1 may have a size the same as that of the second thin film transistor T2. The third thin film transistor T3 may have a size smaller than that of the second thin film transistor T2.

Referring to FIG. 3, the gate line GL, the first, second and third gate electrodes GE1, GE2 and GE3 branching off from the gate line GL, the first storage line SL1, the first storage electrode STE1, the second storage line SL2 and the second storage electrode STE2 are disposed on the first substrate 111.

A gate insulating layer 130 covering the gate line GL, the first, second and third gate electrodes GE1, GE2 and GE3, the first and second storage lines SL1 and SL2, and the first and second storage electrodes STE1 and STE2 is disposed on or above the first substrate 111. The gate insulating layer 130 may include or be formed of an insulating material. In one exemplary embodiment, for example, the gate insulating layer 130 may include a silicon nitride or a silicon oxide.

The first, second and third semiconductor layers SM1, SM2 and SM3 are disposed on the gate insulating layer 130. The first, second and third semiconductor layers SM1, SM2 and SM3 may include or be formed of amorphous silicon or an oxide semiconductor including at least one element selected from gallium (Ga), indium (In), tin (Sn), and zinc (Zn). Although not illustrated, an ohmic contact layer may be disposed on the first, second and third semiconductor layers SM1, SM2 and SM3.

The data line DL extends in the second direction, i.e., in the longitudinal direction, and is disposed on the gate insulating layer 130. The first, second and third source electrodes SE1, SE2 and SE3 are disposed to overlap portions of the first, second and third semiconductor layers SM1, SM2 and SM3, respectively, and the first, second and third drain electrodes DE1, DE2 and DE3 are disposed to overlap another portions of the first, second and third semiconductor layers SM1, SM2 and SM3, respectively, such that the first, second and third thin film transistors T1, T2 and T3 are formed or defined thereby.

The third source electrode SE3 of the third thin film transistor T3 is electrically connected to the first storage electrode STE1 through the third contact hole H3 which is defined through the gate insulating layer 130.

An insulating interlayer 169 is disposed to overlap the data line DL, and the first, second and third thin film transistors T1, T2 and T3. The insulating interlayer 169 covers exposed upper portions of the first, second and third semiconductor layers SM1, SM2 and SM3. The insulating interlayer 169 may have a monolayer or a multilayer structure including silicon oxide, silicon nitride, and/or a photosensitive organic or silicon-based low dielectric constant insulating material, for example.

First and second color filters CF1 and CF2, and a passivation layer 175 are disposed on the insulating interlayer 169.

Referring to FIG. 3, the first and second color filters CF1 and CF2 are disposed on the first substrate 111. The first and second color filters CF1 and CF2 overlap each other in a border area thereof, e.g., areas of the first and second color filters CF1 and CF2 adjacent to a boundary therebetween.

The first and second color filters CF1 and CF2 are disposed to overlap the first and second pixel electrodes PE1 and PE2 and configured to impart color to light that is transmitted through the pixels PX1 and PX2. The first color filter CF1 and the second color filter CF2 have different colors from each other, and may each include a red color filter, a green color filter, or a blue color filter. One of the first color filter CF1 and the second color filter CF2 may be a white color filter.

In an exemplary embodiment, the display device 10 has a color filter on array ("COA") structure in which the first, second and third thin film transistors T1, T2 and T3 and the first and second color filters CF1 and CF2 are disposed in a same panel, e.g., a low panel.

The passivation layer 175 is disposed on the insulating interlayer 169 and the first and second color filters CF1 and CF2. The passivation layer 175 may have a monolayer structure or a multilayer structure including silicon oxides, silicon nitrides, and/or a photosensitive organic or silicon-based low dielectric constant insulating material. The passivation layer 175 may have a thickness in a range of about 1.0 micrometer (μm) to about 2.5 μm.

The passivation layer 175 may include a recessed portion 195. The recessed portion 195 of the passivation layer 175 will be described later in greater detail.

The passivation layer 175 may include or be formed of a negative-type photosensitive composition of which an exposed portion remains and an unexposed portion is developed. In such an embodiment, the passivation layer 175 may include or be formed or a positive-type photosensitive composition. In one exemplary embodiment, for example, the passivation layer 175 may include or be formed of a photosensitive organic material In such an embodiment, where the passivation layer 175 includes the photosensitive organic material, the passivation layer 175 may be referred to as an organic layer.

The passivation layer 175 is configured to planarize upper portions of the first, second and third thin film transistors T1, T2, and T3 and the first and second color filters CF1 and CF2. Accordingly, the passivation layer 175 may be also referred to as a planarization layer.

In an exemplary embodiment, a portion of the insulating interlayer 169 and a portion of the passivation layer 175 are removed, such that the first contact hole H1 exposing a portion of the first drain electrode DE1 and the second contact hole H2 exposing a portion of the second drain electrode DE2 are defined or formed.

The first pixel electrode PE1 and the second pixel electrode PE2 are disposed on the passivation layer 175. The first pixel electrode PE1 is electrically connected to the first drain electrode DE1 through the first contact hole H1. The second pixel electrode PE2 is electrically connected to the second drain electrode DE2 through the second contact hole H2.

Referring to FIGS. 1 and 2, the first and second pixel electrodes PE1 and PE2 include cross-shaped stem portions and pluralities of branch portions respectively extending from the stem portions, respectively.

The first and second pixel electrodes PE1 and PE2 may include or be formed or a transparent conductive material. In one exemplary embodiment, for example, the first and second pixel electrodes PE1 and PE2 may include or be formed of a transparent conductive material such as indium tin oxide ("ITO"), indium zinc oxide ("IZO"), indium tin zinc oxide ("ITZO"), aluminum zinc oxide ("AZO"), and the like.

A light blocking portion 190 is disposed on the recessed portion 195 of the passivation layer 175, e.g., inside a space defined by a recessed surface of the passivation layer 175, and a main column spacer 191 and a sub-column spacer 192 are disposed on the light blocking portion 190.

The light blocking portion 190, the main column spacer 191 and the sub-column spacer 192 will be described later in greater detail.

Although not illustrated, a lower alignment layer may be disposed over the first and second pixel electrodes PE1 and PE2 and the light blocking portion 190. The lower alignment layer may be a homeotropic alignment layer, and may include a photosensitive material.

The second substrate 112 is an insulating substrate including a transparent material such as glass or plastic.

A common electrode CE is disposed on the second substrate 112. The common electrode CE may include or be formed of ITO, AZO, or transparent conductive oxide ("TCO"), for example.

Although not illustrated, an upper alignment layer may be disposed over the common electrode CE. The upper alignment layer may include or be formed of a material the same as the material included in the lower alignment layer described above.

Although not illustrated, in the case that a surface of the first substrate 111 and a surface of the second substrate 112 that face each other, e.g., inner surfaces of the first and second substrates 111 and 112, are defined as upper surfaces of the corresponding substrate, respectively, and surfaces opposite to the upper surfaces, e.g., outer surfaces of the first and second substrates 111 and 112, are defined as lower surfaces of the corresponding substrate, respectively, polarizers may be disposed on the lower surface of the first substrate 111 and the lower surface of the second substrate 112, respectively.

A liquid crystal layer LC is disposed in a space defined between the first substrate 111 and the second substrate 112 secured by the main column spacer 191 and the sub-column spacer 192.

The liquid crystal layer LC may include liquid crystal molecules. The liquid crystal molecules of the liquid crystal layer LC may have a structure in which a major or longitudinal axis thereof is aligned parallel to one of the first substrate 111 and the second substrate 112, and the direction is spirally twisted about 90 degrees from a rubbing direction of the alignment layer of the first substrate 111 to the second substrate 112. Alternatively, the liquid crystal layer LC may include homeotropic liquid crystal molecules.

Hereinafter, operation of the pixel will be described with reference to FIG. 4. FIG. 4 is an equivalent circuit diagram of the pixel PX1 of FIG. 2. The pixels illustrated in FIG. 1 may each be driven in the same manner.

Referring to FIG. 4, an exemplary embodiment of the pixel PX1 includes a first sub-pixel SPX1 and a second sub-pixel SPX2.

The first sub-pixel SPX1 includes the first thin film transistor T1, a first liquid crystal capacitor Clc1 and the first storage capacitor Cst1. The first thin film transistor T1 includes the first gate electrode GE1 connected to the gate line GL, the first source electrode SE1 connected to the data line DL, and the first drain electrode DE1 connected to the first liquid crystal capacitor Clc1 and the first storage capacitor Cst1.

As described hereinabove, the first drain electrode DE1 of the first thin film transistor T1 is connected to the first pixel electrode PE1. The first liquid crystal capacitor Clc1 is defined by the first pixel electrode PE1 and the common electrode CE with the liquid crystal layer LC therebetween. The first pixel electrode PE1 overlaps portions of the first storage line SL1 and the first storage electrode STE1, thus defining or forming the first storage capacitor Cst1.

The second sub-pixel SPX2 includes the second thin film transistor T2, the third thin film transistor T2, a second liquid crystal capacitor Clc2 and the second storage capacitor Cst2. The second thin film transistor T2 includes the second gate electrode GE2 connected to the gate line GL, the second source electrode SE2 connected to the data line DL, and the second drain electrode DE2 connected to the second liquid crystal capacitor Clc2 and the second storage capacitor Cst2.

As described hereinabove, the second drain electrode DE2 of the second thin film transistor T2 is connected to the second pixel electrode PE2. The second liquid crystal capacitor Clc2 is defined by the second pixel electrode PE2 and the common electrode CE with the liquid crystal layer LC therebetween. The second pixel electrode PE2 overlaps portions of the second storage line SL2 and the second storage electrode STE2, thus defining or forming the second storage capacitor Cst2.

The third thin film transistor T3 includes the third gate electrode GE3 connected to the gate line GL corresponding thereto, the third source electrode SE3 receiving a storage voltage Vcst, and the third drain electrode DE3 connected to the second pixel electrode PE2 to which the second drain electrode DE2 of the second thin film transistor T2 is connected.

As described hereinabove, the third source electrode SE3 is electrically connected to the first storage electrode STE1 to thereby receive the storage voltage Vcst. The common electrode CE receives the common voltage Vcom, and the first and second storage lines SL1 and SL2 receive the storage voltage Vcst.

The first, second and third thin film transistors T1, T2 and T3 are turned on by the gate signal applied through the gate line GL.

A data voltage is applied to the first sub-pixel SPX1 through the first thin film transistor T1 that is turned on. In one exemplary embodiment, for example, the data voltage applied through the data line DL is applied to the first pixel electrode PE1 of the first sub-pixel SPX1 through the first thin film transistor T1 that is turned on.

A first pixel voltage corresponding to the data voltage is charged to the first liquid crystal capacitor Clc1. In one exemplary embodiment, for example, the first pixel voltage corresponding to a voltage level difference between the data voltage applied to the first pixel electrode PE1 and the common voltage Vcom applied to the common electrode CE is charged to the first liquid crystal capacitor Clc1. Accordingly, the first pixel voltage is charged to the first sub-pixel SPX1.

The data voltage is applied to the second sub-pixel SPX2 through the second thin film transistor T2 that is turned on, and the storage voltage Vcst is applied to the second sub-pixel SPX2 through the third thin film transistor T3 that is turned on.

A range of a voltage level of the data voltage is set to be wider than that of the storage voltage Vcst. The common voltage Vcom may be set to have an intermediate value in the range of the voltage level of the data voltage. An absolute value of a voltage level difference between the data voltage and the common voltage may be set to be greater than an absolute value of a voltage level difference between the storage voltage Vcst and the common voltage Vcom.

A voltage of a contact point between the second thin film transistor T2 and the third thin film transistor T3 is a voltage divided by resistance values of resistance states when the second thin film transistor T2 and the third thin film transistor T3 are turned on. That is, the voltage of the contact point between the second thin film transistor T2 and the third thin film transistor T3 has a voltage level of about an intermediate value between the data voltage applied through the second thin film transistor T2 that is turned on and the storage voltage Vcst applied through the third thin film transistor T3 that is turned on. The voltage of the contact point between the second thin film transistor T2 and the third thin film transistor T3 is applied to the second pixel electrode PE2. That is, the voltage corresponding to about an intermediate value between the data voltage and the storage voltage Vcst is applied to the second pixel electrode PE2.

A second pixel voltage which corresponds to a voltage level difference between a voltage applied to the second pixel electrode PE2 and the common voltage Vcom applied to the common electrode CE is charged to the second liquid crystal capacitor Clc2. That is, the second pixel voltage having a voltage level lower than that of the first pixel voltage is charged to the second liquid crystal capacitor Clc2. Accordingly, the second pixel voltage having a voltage level lower than that of the first pixel voltage is charged to the second sub-pixel SPX2.

Through the operation carried out in the aforementioned manner, a viewer may perceive a gray level corresponding to an intermediate value between the first pixel voltage charged to the pixel PX1 and the second pixel voltage.

Hereinafter, the recessed portion 195, the light blocking portion 190, the main column spacer 191 and the sub-column spacer 192 will be described in detail.

The recessed portion 195 is defined in the passivation layer 175. Referring to FIGS. 1 and 3, the recessed portion 195 is defined to overlap the gate line GL, the first, second and third thin film transistors T1, T2 and T3, and the data line DL when viewed from a plan view in a thickness direction of the display device 10. However, exemplary embodiments are not limited thereto, and the recessed portion 195 may be defined in another area.

As the passivation layer 175 has the first and second contact holes H1 and H2 and the recessed portion 195, the passivation layer 175 has three step differences. In an exemplary embodiment, the passivation layer 175 may be formed in a photolithography method using a photosensitive composition and a three-tone mask having three portions each having different light transmittances. An exemplary embodiment of a method of forming the passivation layer will be described later in greater detail.

Figure 10A:
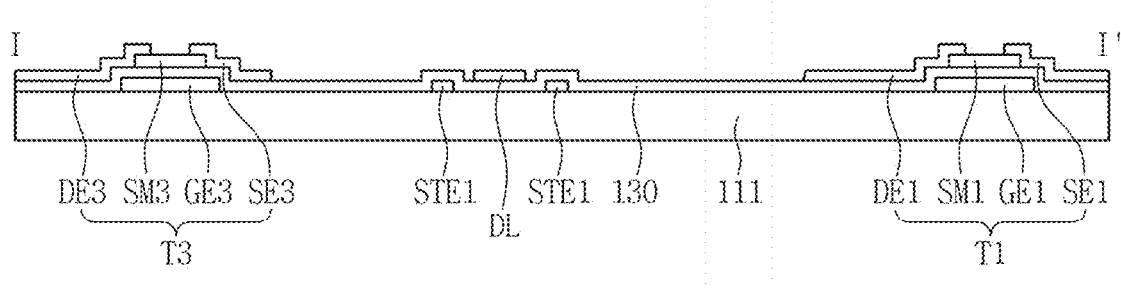
FIGS. 10A, 10B, 10C, 10D, 10E, 10F, 10G, 10H, and 10I are cross-sectional views illustrating an exemplary embodiment of a method of manufacturing the display device of FIG. 1.
Figure 10B:
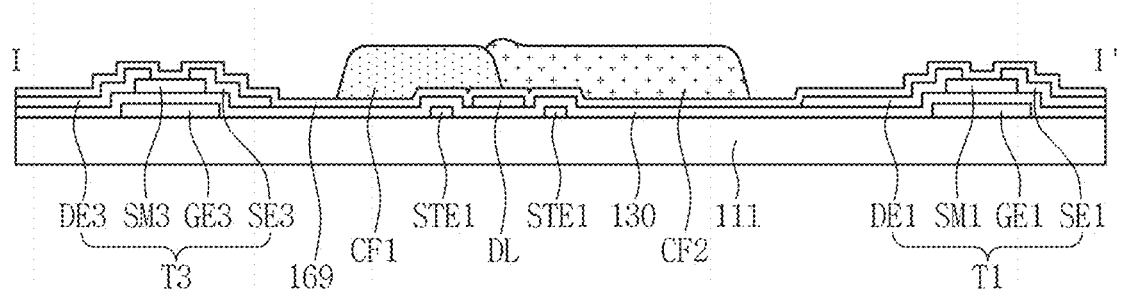
Figure 10C:
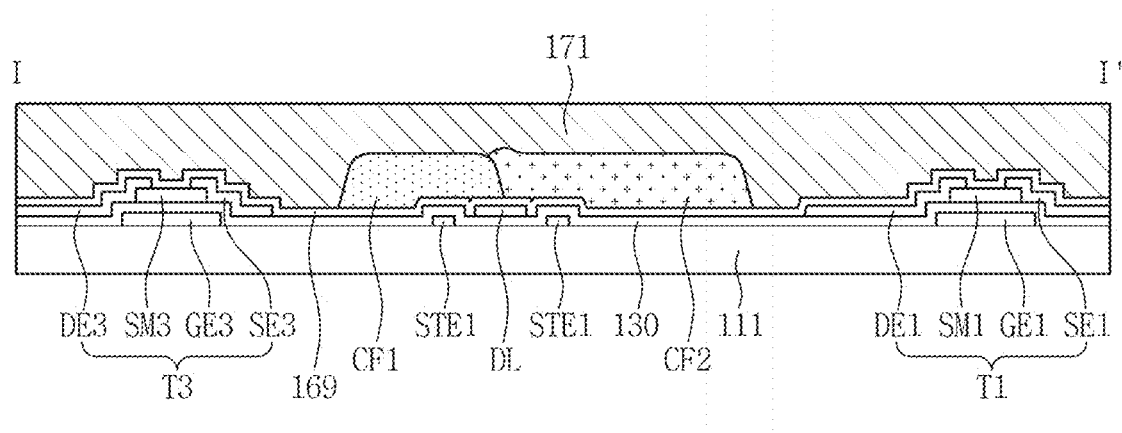
Figure 10D:
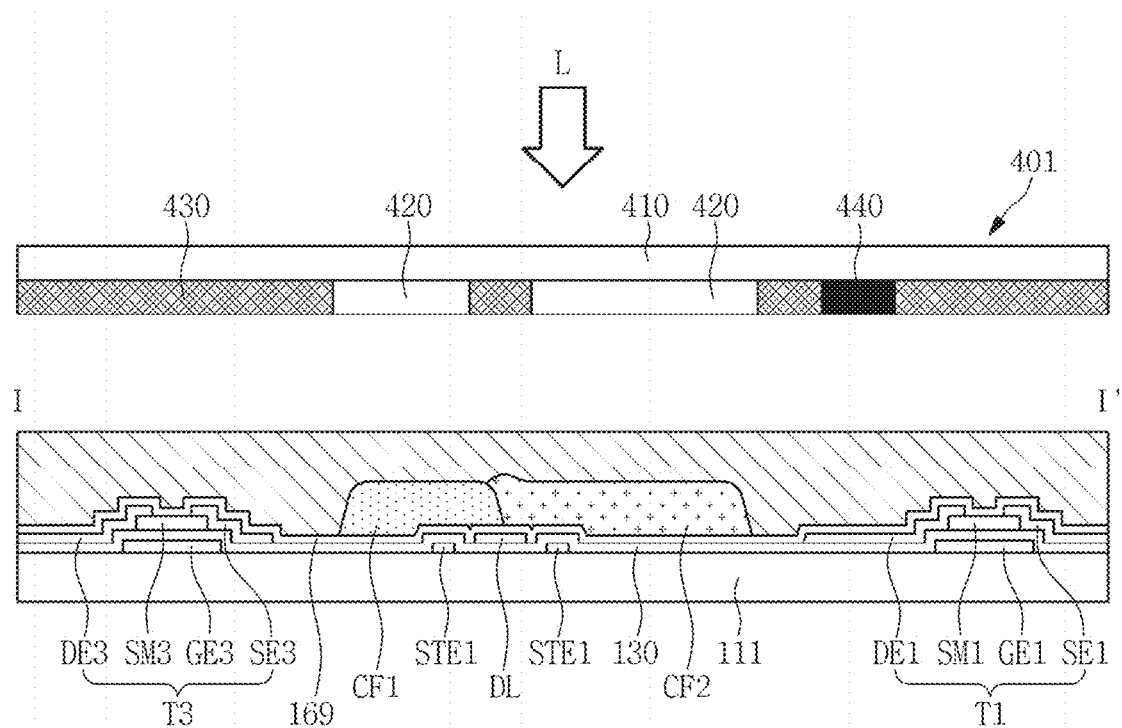
Figure 10E:
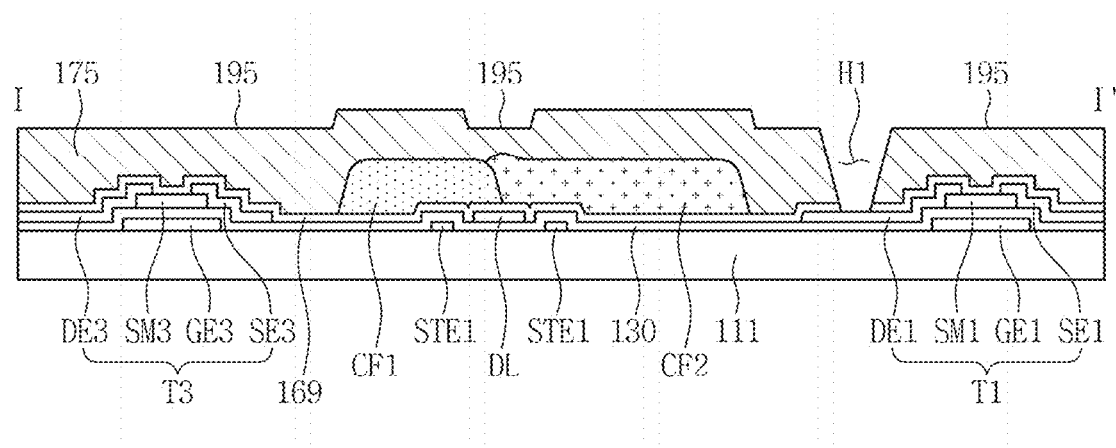

Referring to FIGS. 2, 3 and 10E, the first and second contact holes H1 and H2 are defined in the recessed portion 195. In an exemplary embodiment, where the first and second contact holes H1 and H2 are defined in the recessed portion 195, as compared to a case where the contact holes H1 and H2 are defined in a portion of the passivation layer 175 aside from the recessed portion 195, depths of the contact holes H1 and H2 are reduced by a depth d1 of the recessed portion 195. Accordingly, upper portions of the first and second contact holes H1 and H2 may have relatively smaller diameters in the recessed portion, as compared to the case where the first and second contact holes H1 and H2 are formed in the portion of the passivation layer 175 other than the recessed portion 195, and may form a fine structure with a high degree of accuracy.

The light blocking portion 190 is disposed on the recessed portion 195 of the passivation layer 175.

The main column spacer 191 and the sub-column spacer 192 protrude upwardly, e.g., in a direction perpendicular to the first and the second direction, from the light blocking portion 190 to be disposed on the light blocking portion 190.

The main column spacer 191 and the sub-column spacer 192 may include a material the same as a material included in the light blocking portion 190, or alternatively, may include a different material from the material included in the light blocking portion 190. In an exemplary embodiment, the light blocking portion 190, the main column spacer 191 and the sub-column spacer 192 are integrally formed as a single unitary unit using a same material. In such an exemplary embodiment, a photolithography method may be applied.

A structure in which the main column spacer 191 and the sub-column spacer 192 are simultaneously formed as a unitary structure is referred to as a black column spacer structure. In an exemplary embodiment, the display device 10 has the black column spacer structure.

In such an embodiment, the light blocking portion 190, the main column spacer 191 and the sub-column spacer 192 may include or be formed of a negative-type photosensitive composition of which an unexposed portion is developed. The photosensitive composition used in forming of the light blocking portion 190 may include a binder resin, a polymerizable monomer, a polymerizable oligomer, a pigment, a dispersant, or a photoinitiator, for example. The pigment may include a black pigment, a black resin, and the like, e.g., a carbon black. Hereinafter, the photosensitive composition of the light blocking portion 190, the main column spacer 191 and the sub-column spacer 192 will be referred to as "light blocking material."

The light blocking portion 190 is disposed in a portion aside from the first and second pixel electrodes PE1 and PE2, and may overlap a portion of an edge portion of the first and second pixel electrodes PE1 and PE2. In an alternative exemplary embodiment, the light blocking portion 190 may not overlap the first and second pixel electrodes PE1 and PE2.

The light blocking portion 190 effectively prevents light applied from a backlight unit (not illustrated) from being externally transmitted and further prevents external light from being irradiated to the gate line GL, the data line DL, and the first, second and third thin film transistors T1, T2 and T3. The light blocking portion 190 is also referred to as a black matrix.

Referring to FIGS. 1 and 3, the light blocking portion 190 is disposed over the gate line GL, the first, second and third thin film transistors T1, T2 and T3, and the data line DL. Accordingly, the light blocking portion 190 may have a mesh-shaped planar surface disposed along the gate line GL and the data line DL. In such an embodiment, the light blocking portion 190 may have a mesh-shaped pattern. However, exemplary embodiments are not limited thereto, and alternatively, the light blocking portion 190 may be disposed only over the gate line GL. In such an embodiment, the light blocking portion 190 may have a linear shape.

In an exemplary embodiment, as the light blocking portion 190 is on the recessed portion 195, a thickness of the light blocking portion 190 may be allow to be increased by a depth of the recessed portion 195. Herein, the depth of the recessed portion 195 is defined as a depth or level difference of the upper surface of the recessed portion with respect to non-recessed portions of the passivation layer adjacent therearound.

If the thickness of the light blocking portion 190 is significantly small, the light blocking material may not be sufficiently cross-linked in a process of forming the light blocking portion 190, and thus defects of the light blocking material due to being lifted off from an adherent may occur. According to an exemplary embodiment, the thickness of the light blocking portion 190 may be sufficiently secured such that the lift-off defects of the light blocking material may be effectively prevented.

In such an embodiment, where the thickness of the light blocking portion 190 is increased, light blocking capabilities of the light blocking portion 190 may be enhanced.

In such an embodiment, the recessed portion 195 defines a position of the light blocking portion 190. Accordingly, alignment accuracy of the light blocking portion 190 may be improved by the recessed portion 195.

In such an embodiment, the recessed portion 195 may function as a dam for the light blocking material. Typically, after a pattern forming the light blocking portion 190 is formed using the light blocking material, the light blocking material is cured to form the light blocking portion 190. In such an embodiment, a portion of the light blocking material may have liquidity to be dispersed therearound in a curing process, which may be referred to as "reflow." According to an exemplary embodiment, the recessed portion 195 serves as a dam such that the light blocking material that is reflown may be effectively prevented from being dispersed to another portion. Accordingly, accuracy of the pattern of the light blocking portion 190 may be enhanced. In an exemplary embodiment, where the recessed portion 195 and the light blocking portion 190 are employed, the display device may achieve high definition.

In an exemplary embodiment, where the light blocking portion 190 is disposed on the recessed portion 195, the light blocking portion 190 may not substantially impede the flow of the liquid crystals in a process of injecting the liquid crystals.

A thickness t1 of the light blocking portion 190 may be greater than or less than the depth d1 of the recessed portion 195. In FIG. 3, the thickness t1 of the light blocking portion 190 is depicted as being greater than the depth d1 of the recessed portion 195, but exemplary embodiments are not limited thereto.

The recessed portion 195 may have the depth d1 that is about 10 percent (%) to about 200% of the thickness t1 of the light blocking portion 190. Herein, the thickness t1 of the light blocking portion 190 is defined by a thickness of a portion on the recessed portion, e.g., except the portions in the contact holes H1 and H2. In an exemplary embodiment, the recessed portion 195 may have the depth d1 in a range of about 0.2 micrometer (μm) to about 2 μm. In one exemplary embodiment, for example, the recessed portion 195 may have the depth d1 in a range of about 0.5 μm to about 1.0 μm.

The light blocking portion 190 may have the thickness t1 in a range of about 0.5 μm to about 2.5 μm. In one exemplary embodiment, for example, the light blocking portion 190 may have the thickness t1 in a range of about 0.5 μm to about 1.5 μm.

The main column spacer 191 and the sub-column spacer 192 are spaced apart from each other and have a height difference with respect to a surface, e.g., an upper surface, of the light blocking portion 190. A height h1 of the main column spacer 191 with respect to the surface of the light blocking portion 190 is greater than a height h2 of the sub-column spacer 192 with respect thereto.

The main column spacer 191 mainly supports the first substrate 111 and the second substrate 112 to secure a space. The sub-column spacer 192 supplementarily supports the first substrate 111 and the second substrate 112. The main column spacer 191 and the sub-column spacer 192 maintains a gap between the first substrate 111 and the second substrate 112 to be substantially uniform to improve operational characteristics of the display device 10.

In one exemplary embodiment, for example, a gap between the first substrate 111 and the second substrate 112 of the display device 10 is referred to as a cell gap, and the cell gap affects operational characteristics of the display device 10 such as a response speed, a contrast ratio, a viewing angle, and luminance uniformity. Accordingly, it is desired to maintain a uniform cell gap across an overall area between the first substrate 111 and the second substrate 112 so that a uniform image may be displayed across an entire surface of the display device 10.

Referring to FIG. 3, a gap between the passivation layer 175 and the common electrode CE may be defined as a cell gap. The cell gap may be in a range of about 3 μm to about 4 μm, for example, in a range of about 3.2 μm to about 3.4 μm.

The light blocking portion 190, the main column spacer 191 and the sub-column spacer 192 may have heights different from one another and in the range of the height of the cell gap, that is, about 3 μm to about 4 μm, for example, about 3.2 μm to about 3.4 μm. When the heights of the light blocking portion 190, the main column spacer 191 and the sub-column spacer 192 are in the range of about 3 μm to about 4 μm, more accurate patterning is desired in the forming of the light blocking portion 190, the main column spacer 191 and the sub-column spacer 192 that have different heights from one another.

According to an exemplary embodiment, the main column spacer 191 and the sub-column spacer 192 are disposed on the recessed portion 195 of the passivation layer 175. In such an embodiment, a space in which the main column spacer 191 and the sub-column spacer 192 are disposed is increased by the depth of the recessed portion 195. Accordingly, a height difference between the main column spacer 191 and the sub-column spacer 192 may be easily imparted.

In an exemplary embodiment, a light blocking material is coated on the passivation layer 175, and the light blocking material is exposed and developed in a selective manner, such that the light blocking portion 190, the main column spacer 191 and the sub-column spacer 192 are formed. In such an embodiment, the light blocking material disposed on a portion of the passivation layer 175 to be formed with the main column spacer 191 and the sub-column spacer 192 has a greater thickness than a thickness of another portion thereof (refer to FIG. 10H). In such an embodiment, the patterning is performed using the light blocking material having a relatively greater thickness, such that the height difference between the main column spacer 191 and the sub-column spacer 192 may be secured to be relatively large, and thus the main column spacer 191 and the sub-column spacer 192 may be relatively readily formed.

In an exemplary embodiment, a light blocking material having a relatively high light transmittance may be used so that a difference in a level of light exposure based on light intensity is distinctly distinguished.

According to an exemplary embodiment, a light blocking material having a relatively high light transmittance may be used. In one exemplary embodiment, for example, a light blocking material including a relatively low content of black pigment such as carbon black may be used to form the light blocking portion 190, the main column spacer 191 and the sub-column spacer 192. According to an exemplary embodiment, a photosensitive material having an optical density less than about 2, for example, less than about 1.3, with respect to a light (e.g., i-ray) having a wavelength of about 365 nanometers (nm) for the thickness of about 1 μm may be used.

According to an exemplary embodiment, as the light blocking portion 190 may have a relatively great thickness, the light blocking capability of the light blocking portion 190 may not be degraded even though a light blocking material having a relatively high light transmittance is used. In such an embodiment, as the light blocking material having a relatively high light transmittance is used, the height difference between the main column spacer 191 and the sub-column spacer 192 may be readily secured.

The main column spacer 191 may have a height in a range of about 2 μm to about 4 μm with respect to the surface of the light blocking portion 190. In one exemplary embodiment, for example, the main column spacer 191 may have a height in a range of about 2.5 μm to about 3.5 μm with respect to the surface of the light blocking portion 190.

The sub-column spacer 192 may have a height in a range of about 1 μm to about 3.5 μm with respect to the surface of the light blocking portion 190. In one exemplary embodiment, for example, the sub-column spacer 192 may have a height in a range of about 1.5 μm to about 3 μm with respect to the surface of the light blocking portion 190.

At least one of the main column spacer 191 and the sub-column spacer 192 may overlap at least one of the first, second and third thin film transistors T1, T2 and T3. In an exemplary embodiment, as shown in FIGS. 1 and 3, the main column spacer 191 may be disposed to overlap the third thin film transistor T3, and the sub-column spacer 192 may be disposed to overlap the first thin film transistor T1.

Referring to FIG. 5, the recessed portion 195 may be defined on the data line DL. In such an embodiment, a distance between a bottom surface of the recessed portion 195 and the data line DL may be in a range of about 1.5 μm to about 5 μm. In one exemplary embodiment, for example, the distance between the bottom surface of the recessed portion 195 and the data line DL may be in a range of about 2 μm to about 3 μm.

Referring to FIG. 5, the first and second pixel electrodes PE1 and PE2 are disposed on a convex portion of the surface of the passivation layer 175 that is higher than the recessed portion 195. Accordingly, even though the recessed portion 195 is formed in the passivation layer 175, a distanced space between the data line DL and the first and second pixel electrodes PE1 and PE2 may be sufficiently secured, and thus an resistance-capacitance ("R-C") delay which may occur due to an interaction between the first and second pixel electrodes PE1 and PE2 may be significantly reduced or prevented.

In an exemplary embodiment, referring to FIGS. 3 and 5, the first color filter CF1 and the second color filter CF2 are disposed below the passivation layer 175, for example, between the first substrate 111 and the passivation layer 175, and the first color filter CF1 and the second color filter CF2 overlap each other at a border area between the first color filter CF1 and the second color filter CF2. The recessed portion 195 may be defined in an overlapping area between the first color filter CF1 and the second color filter CF2. However, exemplary embodiments are not limited thereto, and alternatively, the recessed portion 195 and the light blocking portion 190 may not be provided in the overlapping area between the first color filter CF1 and the second color filter CF2.

Figure 6:
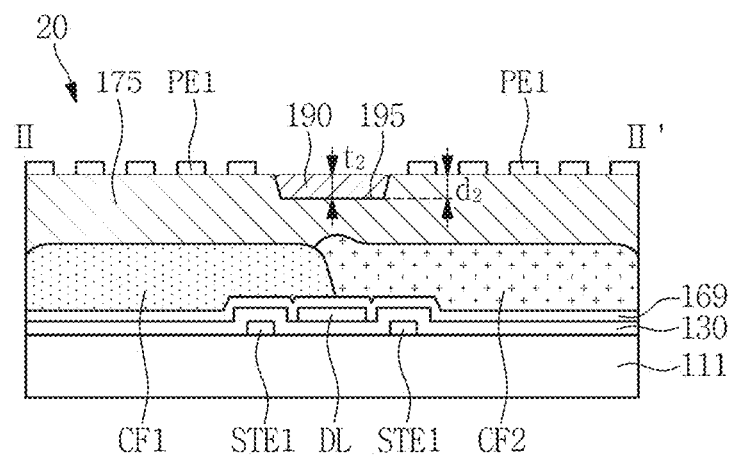
FIG. 6 is a cross-sectional view illustrating an alternative exemplary embodiment of a display device.

Hereinafter, an alternative exemplary embodiment will be described with reference to FIG. 6. FIG. 6 is a cross-sectional view illustrating an alternative exemplary embodiment of a display device.

In an exemplary embodiment, as shown in FIG. 6, a display device 20 includes a first substrate 111, a first color filter CF1 on the first substrate 111, a second color filter CF2 disposed on the first substrate 111 and including a color different from that of the first color filter CF1, a passivation layer 175 disposed on the first color filter CF1 and the second color filter CF2 and having a recessed portion 195, and a light blocking portion 190 on the recessed portion 195 of the passivation layer 175. The first color filter CF1 and the second color filter CF2 overlap each other in a border area thereof, and the recessed portion 195 is disposed along the overlapping area of first color filter CF1 and the second color filter CF2.

Referring to FIG. 6, the recessed portion 195 has a depth d2, and the light blocking portion 190 on the recessed portion 195 has a thickness t2. The depth d2 of the recessed portion 195 may be greater than or equal to the thickness t2 of the light blocking portion 190. That is, the depth d2 of the recessed portion 195 and the thickness t2 of the light blocking portion 190 may satisfy the following in equation: $d2 \geq t2$.

Hereinafter, another alternative exemplary embodiment will be described with reference to FIG. 7.

Figure 7:
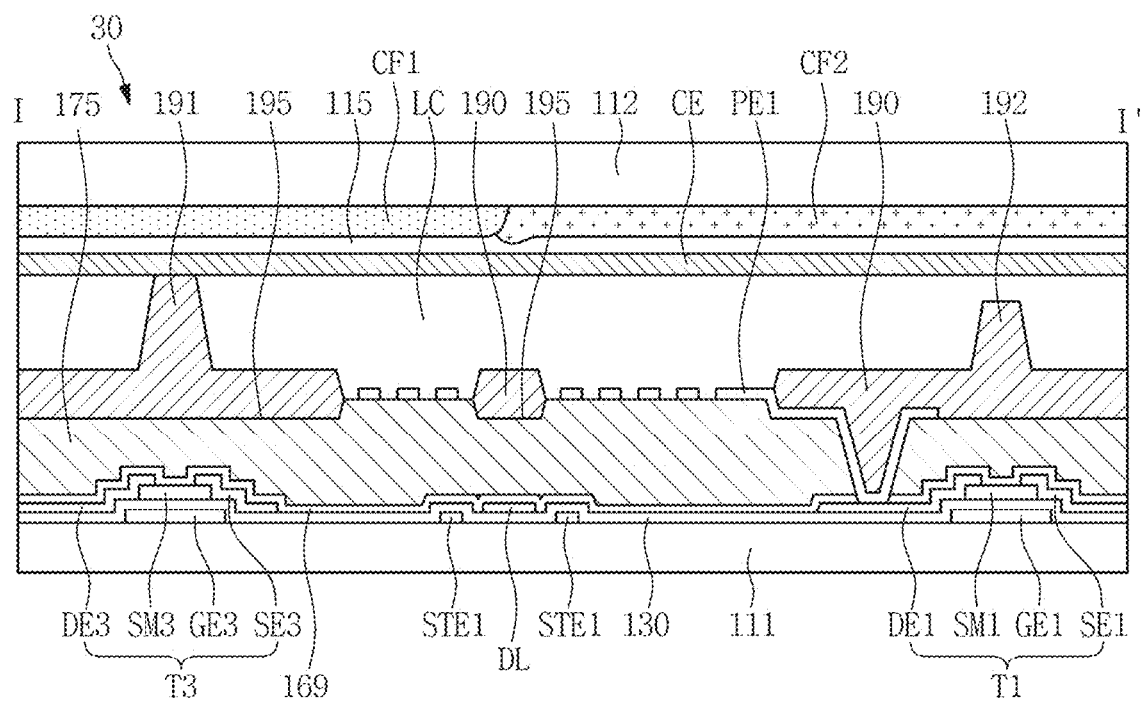
FIG. 7 is a cross-sectional view illustrating another alternative exemplary embodiment of a display device.

FIG. 7 is a cross-sectional view illustrating another alternative exemplary embodiment of a display device. In such an embodiment, the display device 30 is an LCD device, and has substantially the same configuration as that of the exemplary embodiments of the display device 10 described above with reference to FIGS. 1 to 5, except that the first and second color filters CF1 and CF2 are disposed on the second substrate 112. The same or like elements shown in FIG. 7 have been labeled with the same reference characters as used above to describe the exemplary embodiments of the display device shown in FIGS. 1 to 5, and any repetitive detailed description thereof will hereinafter be omitted or simplified.

In such an embodiment, the display device 30 includes a first substrate 111, a second substrate 112, and a liquid crystal layer LC.

In such an embodiment, first, second and third thin film transistors T1, T2 and T3, a passivation layer 175, a first pixel electrode PE1, a second pixel electrode PE2, a light blocking portion 190, a main column spacer 191, and a sub-column spacer 192 are disposed on the first substrate 111.

In such an embodiment, color filters CF1 and CF2, an overcoat layer 115, and a common electrode CE are disposed on the second substrate 112.

The color filters CF1 and CF2 are disposed on upper portions of pixels PX1 and PX2, respectively. Each of the color filters CF1 and CF2 may include a red color filter, a green color filter, or a blue color filter.

The overcoat layer 115 is disposed over the color filters CF1 and CF2. The overcoat layer 115 planarizes a surface therebelow, e.g., upper portions of the color filters CF1 and CF2, and protects the color filters CF1 and CF2.

The common electrode CE is disposed on the overcoat layer 115.

The liquid crystal layer LC is disposed between the first substrate 111 and the second substrate 112.

Hereinafter, another alternative exemplary embodiment will be described with reference to FIGS. 8 and 9.

Figure 8:
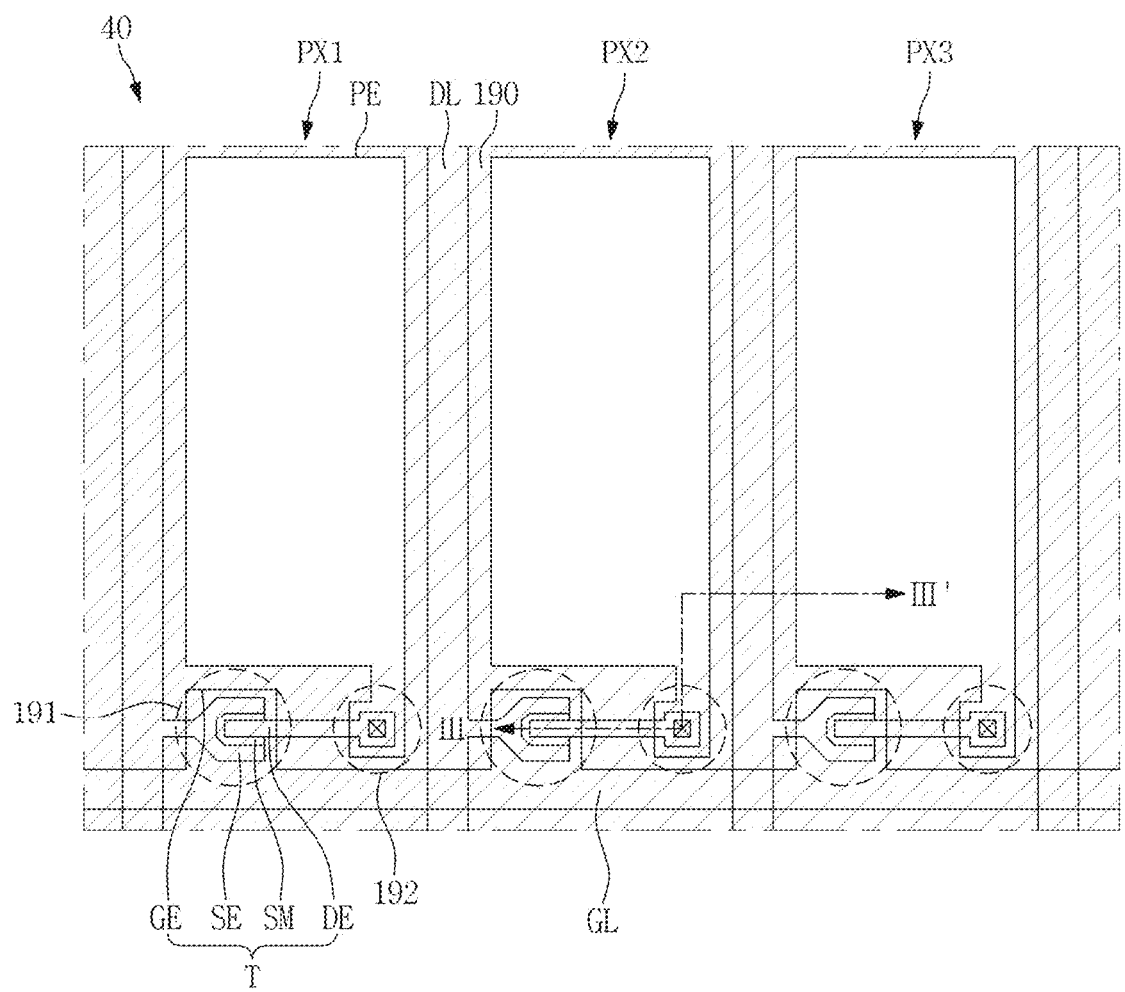
FIG. 8 is a cross-sectional view illustrating another alternative exemplary embodiment of a display device.
Figure 9:
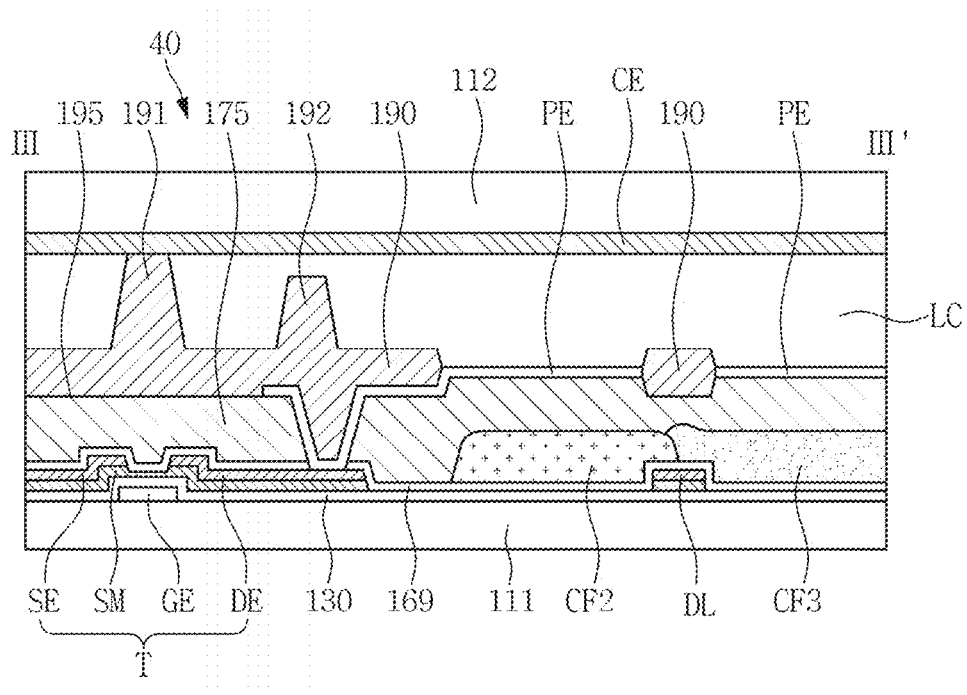
FIG. 9 is a cross-sectional view taken along line of FIG. 8.

FIG. 8 is a cross-sectional view illustrating another alternative exemplary embodiment of a display device, and FIG. 9 is a cross-sectional view taken along line of FIG. 8.

The exemplary embodiment of the display device 40 shown in FIG. 8 is an LCD device. The exemplary embodiment of the display device 40 shown in FIG. 8 includes a first substrate 111, a second substrate 112 opposing the first substrate 111, and a liquid crystal layer LC between the first substrate 111 and the second substrate 112.

Referring to FIGS. 8 and 9, an exemplary embodiment of the display device 40 includes a plurality of pixels PX1, PX2 and PX3. Each of the pixels PX1, PX2 and PX3 includes a pixel electrode PE.

The first substrate 111 is an insulating substrate which includes plastic or transparent glass, e.g., soda lime glass or borosilicate glass.

A gate line GL, which transmit gate signals, is disposed on the first substrate 111. The gate line GL extends in a direction, e.g., in a transverse direction or a first direction. A gate electrode GE protrudes in the second direction from the gate line GL.

A gate insulating layer 130 is disposed on the first substrate 111, the gate line GL and the gate electrode GE.

A semiconductor layer SM for forming a channel of the thin film transistor T is disposed on the gate insulating layer 130. At least a portion of the semiconductor layer SM overlaps the gate electrode GE.

The data line DL is disposed on the gate insulating layer 130. The data line DL is disposed to intersect the gate line GL. In one exemplary embodiment, for example, the data line DL extends in a longitudinal direction or a second direction.

A source electrode SE branches off from the data line DL and extends onto an upper portion of the semiconductor layer SM. The drain electrode DE is spaced apart from the source electrode SE and opposes the source electrode SE with respect to the channel area of the thin film transistor T to be disposed over the semiconductor layer SM.

The gate electrode GE, the source electrode SE, the drain electrode DE and the semiconductor layer SM collectively define the thin film transistor T.

An insulating interlayer 169 is disposed on the thin film transistor T.

A first color filter (not illustrated), a second color filter CF2, and a third color filter CF3 are disposed on the insulating interlayer 169. In such an embodiment, the first color filter (not illustrated) may be a red color filter, the second color filter CF2 may be a green color filter, and the third color filter CF3 may be a blue color filter. The color filter may include a white color filter (not illustrated).

Each of the second and third color filters CF2 and CF3 may overlap the thin film transistor T, or alternatively, may not overlap the thin film transistor T. Referring to FIG. 9, each of the second and third color filters CF2 and CF3 is disposed in an area that does not overlap the thin film transistor T. Referring to FIG. 9, the second color filter CF2 and the third color filter CF3 overlap each other in a border area thereof.

The passivation layer 175 is disposed on the insulating interlayer 169 and the second and third color filters CF2 and CF3. The passivation layer 175 may have a monolayer structure or a multilayer structure including, for example, silicon oxide, silicon nitride, a photosensitive organic material, or a silicon-based insulating material having a low dielectric constant (low-k).

In an exemplary embodiment, a contact hole exposing a portion of the drain electrode DE is defined in the insulating interlayer 169 and the passivation layer 175. In one exemplary embodiment, for example, a portion of the insulating interlayer 169 and a portion of the passivation layer 175 are removed such that the contact hole is defined.

A pixel electrode PE is disposed on the passivation layer 175. The pixel electrode PE is electrically connected to the drain electrode DE through the contact hole.

The passivation layer 175 has at least one recessed portion 195.

Referring to FIGS. 8 and 9, the recessed portion 195 is positioned above the gate line GL, the thin film transistor T and the data line DL. The recessed portion 195 overlaps the gate line GL, the thin film transistor T and the data line DL when viewed from a plan view in a thickness direction of the display device 40.

A light blocking portion 190 is disposed on the recessed portion 195. A main column spacer 191 and a sub-column spacer 192 protrude upwardly from the light blocking portion 190 to be disposed on the light blocking portion 190.

The light blocking portion 190 is disposed in a non-pixel area, e.g., an area aside from the pixel electrode PE, and may overlap a portion of an edge portion of the pixel electrode PE. Alternatively, the light blocking portion 190 may not overlap the pixel electrode PE. In one exemplary embodiment, for example, the light blocking portion 190 may have a mesh-structured planar surface along the gate line GL and the data line DL, i.e., may have a mesh-shaped pattern.

In an alternative exemplary embodiment, the light blocking portion 190 may only be disposed above the gate line GL. In such an embodiment, the recessed portion 195 may be positioned above or to overlap only the gate line GL.

The main column spacer 191 and the sub-column spacer 192 protrude upwardly from the light blocking portion 190. The main column spacer 191 and the sub-column spacer 192 have a height difference therebetween and are spaced apart from each other. With respect to a surface of the light blocking portion 190, the main column spacer 191 has a greater height than that of the sub-column spacer 192.

According to an exemplary embodiment, the light blocking portion 190, the main column spacer 191, and the sub-column spacer 192 include a same material and are formed in a same process.

The second substrate 112 is an insulating substrate that includes or is formed of transparent glass or plastic.

A common electrode CE is disposed on the second substrate 112.

The liquid crystal layer LC is disposed in a space, between the first substrate 111 and the second substrate 112, which is secured by the main column spacer 191 and the sub-column spacer 192.

Hereinafter, an exemplary embodiment of a method of manufacturing the display device 10 shown in FIG. 1 will be described with reference to FIGS. 10A, 10B, 10C, 10D, 10E, 10F, 10G, 10H, and 10I. FIGS. 10A, 10B, 10C, 10D, 10E, 10F, 10G, 10H, and 10I are cross-sectional views illustrating an exemplary embodiment of a method of manufacturing the display device 10 of FIG. 1.

Referring to FIG. 10A, the first thin film transistor T1, the second thin film transistor T2 and the third thin film transistor T3 are provided or formed on the first substrate 111 including, or being formed using, transparent glass or plastic, for example.

In one exemplary embodiment, for example, the gate line GL and the first, second and third gate electrodes GE1, GE2 and GE3 are provided or formed on the first substrate 111. In such an embodiment, the first and second storage lines SL1 and SL2 and the first and second storage electrodes STE1 and STE2 are provided or formed on the first substrate 111.

The gate insulating layer 130 is provided or formed on the first substrate 111 to cover the gate line GL, the first, second and third gate electrodes GE1, GE2, and GE3, the first and second storage lines SL1 and SL3, and the first and second storage electrodes STE1 and STE2.

The first, second and third semiconductor layers SM1, SM2 and SM3, which overlap at least portions of the first, second and third gate electrodes GE1, GE2 and GE3, respectively, are provided or formed on the gate insulating layer 130.

In such an embodiment, the data line DL, intersecting the gate line GL, is provided or formed on the gate insulating layer 130. The first, second and third source electrodes SE1, SE2 and SE3, and the first, second and third drain electrodes DE1, DE2 and DE3 are provided or formed on the gate insulating layer 130.

Referring to FIG. 10B, the insulating interlayer 169 is provided or formed on the gate insulating layer 130 and the first, second, and third thin film transistors T1, T2, and T3, and the first and second color filters CF1 and CF2 are provided or formed on the insulating interlayer 169. Each of the first and second color filters CF1 and CF2 may be one of a red color filter, a green color filter and a blue color filter.

In an exemplary embodiment, a process of providing the first and second color filters CF1 and CF2 may include providing the first color filter CF1 on the insulating interlayer 169 of the first substrate 111 and providing the second color filter CF2, having a different color from that of the first color filter CF1, on the insulating interlayer 169 of the first substrate 111. In such an embodiment, the first color filter CF1 and the second color filter CF2 overlap each other in a border area thereof.

Referring to FIG. 10C, a first photosensitive composition 171 for forming a passivation layer is coated on the first, second and third thin film transistors T1, T2 and T3, and the first and second color filters CF1 and CF2.

The first photosensitive composition 171 is a negative-type photosensitive resin composition in which an exposed portion remains and an unexposed portion is developed. The passivation layer 175 formed by the first photosensitive composition 171 is an organic layer.

However, exemplary embodiments are not limited thereto, and alternatively, a positive-type photosensitive resin composition of which solubility with respect to a developing solution increases by photo-irradiation may be used as the first photosensitive composition 171.

The first photosensitive composition may include a binder resin, a polymerizable monomer, a polymerizable oligomer, a dispersant and a photoinitiator, for example.

Referring to FIG. 10D, a first exposure mask 401 is disposed over the first photosensitive composition 171 to be spaced apart from the first photosensitive composition 171, and a light L is irradiated to the first photosensitive composition 171 through the first exposure mask 401 to perform light exposure.

The first exposure mask 401 includes a transmissive pattern 420, a semi-transmissive pattern 430, and a blocking pattern 440 on a transparent base 410. The first exposure mask 401 is a three-tone mask.

The blocking pattern 440 of the first exposure mask 401 is disposed above or to overlap an area of the first photosensitive composition 171 to be provided as the first and second contact holes H1 and H2, the semi-transmissive pattern 430 is disposed above an area of the first photosensitive composition 171 to be provided as the recessed portion 195 of the passivation layer 175, and the transmissive pattern 420 is disposed above an area except the areas to be provided as the first and second contact holes H1 and H2, and the recessed portion 195.

The transmissive pattern 420 of the first exposure mask 401 may have a light transmittance of about 95 percent (%) or higher, the blocking pattern 440 may have a light transmittance of about 5% or lower, and the semi-transmissive pattern 430 may have a light transmittance in a range of about 50% to about 60%. The light transmittances of the transmissive pattern 420, the blocking pattern 440, and the semi-transmissive pattern 430 may vary based on the kind of the first photosensitive composition 171.

Based on the kind of the first photosensitive composition 171, the transmissive pattern 420 may have a light transmittance in a range of about 90% to about 100%, the blocking pattern 440 may have a light transmittance in a range of about 0% to about 1%, and the semi-transmissive pattern 430 may have a light transmittance in a range of about 30% to about 40%. In an alternative exemplary embodiment, the semi-transmissive pattern 430 may have a light transmittance in a range of about 60% to about 70%.

The semi-transmissive pattern 430 and the blocking pattern 440 may be formed by coating a light blocking material. In one exemplary embodiment, for example, the light transmittance of the semi-transmissive pattern 430 may be controlled by adjusting a concentration of the light blocking material disposed on the transparent base 410.

In an exemplary embodiment, the semi-transmissive pattern 430 may have a structure in which a transmissive portion and a light blocking slit (not illustrated) are alternately disposed. In such an embodiment, the light transmittance of the semi-transmissive pattern 430 may be controlled by adjusting a distance between the transmissive portion and the light blocking slit.

Referring to FIG. 10E, the first photosensitive composition 171 which is exposed may be developed by a developing solution and cured such that the passivation layer 175 is formed.

In an exemplary embodiment, portions of the first photosensitive composition 171 and the insulating interlayer 169 that are below the blocking pattern 440 of the first exposure mask 401 are removed such that the first and second contact holes H1 and H2, which respectively expose portions of the first and second drain electrodes DE1 and DE2, are formed. In such an embodiment, a portion of the first photosensitive composition 171 that is below the semi-transmissive pattern 430 of the first exposure mask 401 is partially removed such that the recessed portion 195 having a depth d1 is defined. The recessed portion 195 may be formed or defined along the gate line GL and the data line DL and may be formed or defined in an overlapping area of the first color filter CF1 and the second color filter CF2.

Figure 10F:
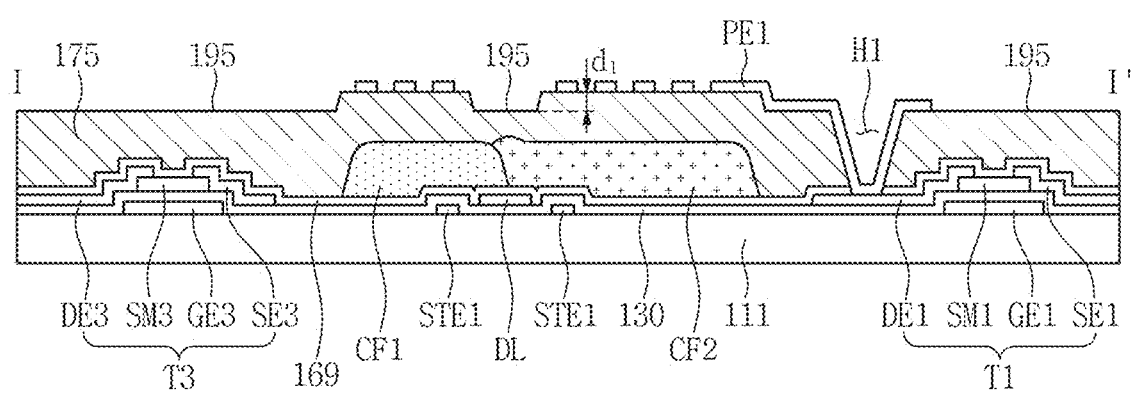

Referring to FIG. 10F, the first pixel electrode PE1 electrically connected to the first drain electrode DE1 through the first contact hole H1 is provided or formed on the passivation layer 175, and the second pixel electrode PE2 electrically connected to the second drain electrode DE2 through the second contact hole H2 is provided or formed thereon.

Figure 10G:
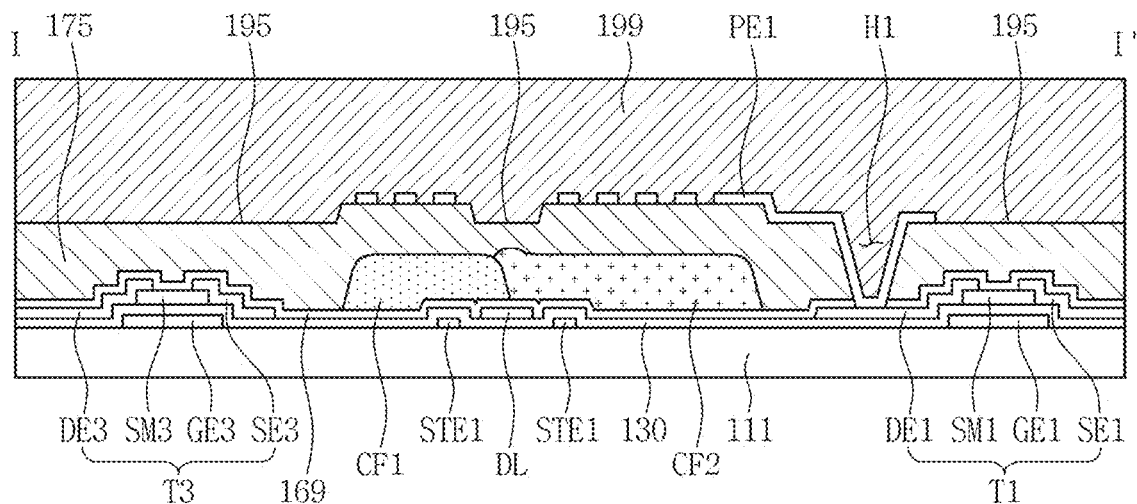

Referring to FIG. 10G, a second photosensitive composition 199 for forming a light blocking portion is coated on the passivation layer 175 and the first and second pixel electrodes PE1 and PE2. The second photosensitive composition 199 includes a negative-type photosensitive resin composition. The second photosensitive composition 199 may include a binder resin, a polymerizable monomer, a polymerizable oligomer, a pigment, a dispersant, and a photoinitiator, for example. The pigment may include a black pigment, a black resin, and the like, e.g., a carbon black. The second photosensitive composition 199 includes a light blocking material to integrally form the light blocking portion 190, the main column spacer 191, and the sub-column spacer 192 as a unitary unit.

Figure 10H:
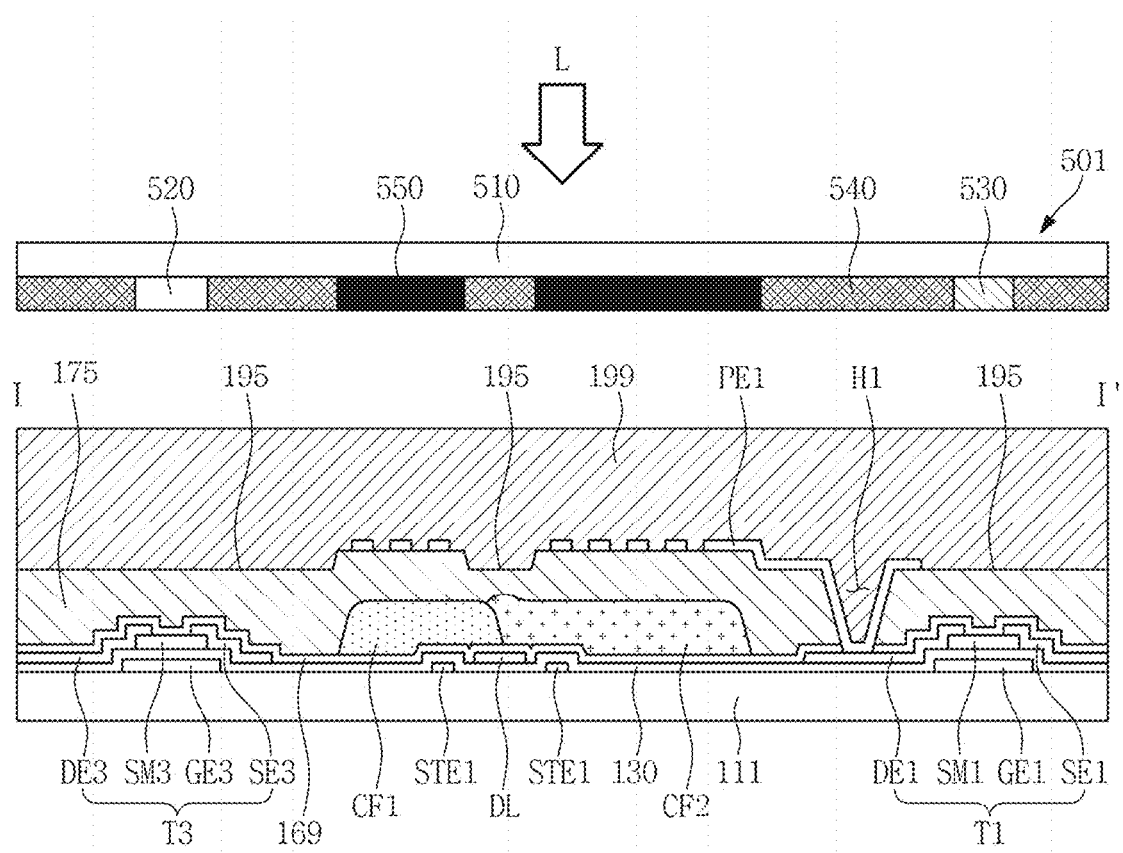

Referring to FIG. 10H, a second exposure mask 501 is disposed over the second photosensitive composition 199 to be spaced apart from the second photosensitive composition 199, and a light L is irradiated to the second photosensitive composition 199 through the second exposure mask 501 such that light exposure may be performed.

The second exposure mask 501 includes a transmissive pattern 520, a first semi-transmissive pattern 530, a second semi-transmissive pattern 540, and a blocking pattern 550 on a transparent base 510. The second exposure mask 501 is a four-tone mask having different light transmittances from one another.

The transmissive pattern 520 of the second exposure mask 501 is disposed above or to overlap an area to be provided as the main column spacer 191, the first semi-transmissive pattern 530 is disposed above or to overlap an area to be provided as the sub-column spacer 192, the second semi-transmissive pattern 540 is disposed above or to overlap an area to be provided as the light blocking portion 190 except the area to be provided as the main column spacer 191 and the area to be provided as the sub-column spacer 192, and the blocking pattern 550 is disposed above or to overlap an area to be provided as the first and second pixel electrodes PE1 and PE2.

The transmissive pattern 520 of the second exposure mask 501 may have a light transmittance of about 95% or higher, the blocking pattern 550 may have a light transmittance of about 5% or lower, the first semi-transmissive pattern 530 may have a light transmittance in a range of about 60% to about 70%, and the second semi-transmissive pattern 540 may have a light transmittance in a range of about 30% to about 40%.

The light transmittances of the transmissive pattern 520, the blocking pattern 550, the first semi-transmissive pattern 530 and the semi-transmissive pattern 540 of the second exposure mask 501 may vary based on a thickness t1 of the light blocking portion 190 and the kind of the second photosensitive composition 199. In one exemplary embodiment, for example, the transmissive pattern 520 may have a light transmittance of about 100%, the blocking pattern 550 may have a light transmittance in a range of about 0% to about 1%, the first semi-transmissive pattern 530 may have a light transmittance in a range of about 50% to about 60%, and the second semi-transmissive pattern 540 may have a light transmittance in a range of about 20% to about 30%

The light transmittances of the first semi-transmissive pattern 530 and the second semi-transmissive pattern 540 may be controlled by adjusting a concentration of the light blocking material. In an exemplary embodiment, the first semi-transmissive pattern 530 and the second semi-transmissive pattern 540 may have a structure in which a transmissive portion and a light blocking slit (not illustrated) are alternately disposed. In such an embodiment, the light transmittances of the first semi-transmissive pattern 530 and the second semi-transmissive pattern 540 may be controlled by adjusting a distance between the transmissive portion and the light blocking slit.

When the second exposure mask has four patterns, there is a limit in a difference range among light transmittances of the respective patterns. Accordingly, in the case that the four-tone mask is used, a difference among exposure levels of areas corresponding to respective patterns is relatively small in an exposure process, and thus the second photosensitive composition 199 is desired to have a relatively high sensitivity to light, to effectively performed the exposure process. In an exemplary embodiment, a light blocking material that has a low content of a black pigment, such as a carbon black, to have a high sensitivity toward a light intensity difference may be used as the second photosensitive composition 199. In such an embodiment, a thickness of the light blocking portion 190 is substantially great or sufficiently secured so that the light blocking portion 190 may effectively perform a light blocking function.

Figure 10I:
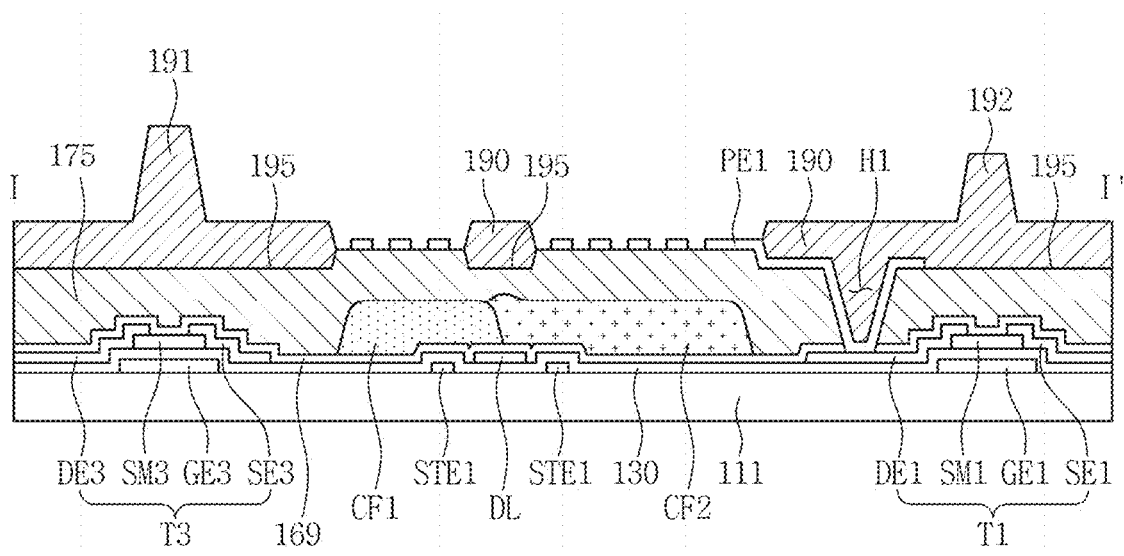

Referring to FIG. 10I, the second photosensitive composition 199 that is exposed is developed by a developing solution and cured such that the light blocking portion 190, the main column spacer 191 and the sub-column spacer 192 are formed.

In one exemplary embodiment, for example, after a pattern for forming the light blocking portion 190 is formed by development, the light blocking material of the pattern for forming the light blocking portion 190 is cured, such that the light blocking portion 190 is provided. In such an embodiment, reflow, that is, a phenomenon in which a portion of the light blocking material has liquidity to be dispersed to a surrounding area, may occur in the curing process. In such an embodiment, the recessed portion 195 serves as a dam such that the light blocking material that is reflown is effectively prevented from being dispersed to another area. Accordingly, a degree of pattern accuracy of the light blocking portion 190 may be improved.

In an exemplary embodiment, the second substrate 112 is provided or disposed on the light blocking portion 190, the main column spacer 191 and the sub-column spacer 192 to oppose the first substrate 111, and the liquid crystal layer LC is provided or disposed between the first substrate 111 and the second substrate 112.

In an exemplary embodiment, the common electrode CE is provided or formed on the second substrate 112, the liquid crystal layer LC is disposed on the first substrate 111, the first substrate 111 and the second substrate 112 are bonded to each other, and thereby the display device 10 illustrated in FIG. 3 is provided.

According to one or more exemplary embodiments set forth herein, the light blocking portion, the main column spacer and the sub-column spacer are disposed on the recessed portion, such that the thickness of the light blocking portion may be readily secured. In such embodiments, a content of a pigment or dye may be reduced in the light blocking material for forming the main column spacer and the sub-column spacer, a degree of pattern accuracy may be improved in a photolithography process, and operational characteristics may be improved. In such embodiments, a height difference may be stably secured between the main column spacer and the sub-column spacer.

From the foregoing, it will be appreciated that various embodiments in accordance with the disclosure have been described herein for purposes of illustration, and that various modifications may be made without departing from the scope and spirit of the present teachings. Accordingly, the various embodiments disclosed herein are not intended to be limiting of the true scope and spirit of the teachings herein. Various features of the above described and other embodiments can be mixed and matched in any manner, to produce further embodiments consistent with the invention.

What is claimed is:
1. A display device comprising:
a first substrate;
a first color filter on the first substrate;
a second color filter on the first substrate, wherein the second color filter has a color different from a color of the first color filter;
a light blocking portion on the first color filter and the second color filter,
a main column spacer which protrudes from the light blocking portion;
a sub-column spacer which protrudes from the light blocking portion, wherein the sub-column spacer is spaced apart from the main column spacer;
wherein the first color filter and the second color filter overlap each other in a border area thereof, and
wherein the light blocking portion overlaps the border area in which the first color filter and the second color filter overlap each other.

2. The display device as claimed in claim 1, wherein the main column spacer has a height greater than a height of the sub-column spacer with respect to a surface of the light blocking portion.

3. The display device as claimed in claim 1, wherein the light blocking portion, the main column spacer and the sub-column spacer comprise a same material as each other.

4. The display device as claimed in claim 1, wherein the light blocking portion has a thickness in a range of about 0.5 micrometer to about 2.5 micrometers.

5. The display device as claimed in claim 1, further comprising:
a second substrate on the light blocking portion to oppose the first substrate; and
a liquid crystal layer between the first substrate and the second substrate.

6. The display device as claimed in claim 1, further comprising:
a gate line between the first substrate and the passivation layer, wherein the gate line extends in a first direction;
a data line between the first substrate and the passivation layer, wherein the data line extends in a second direction which intersects the first direction;
a thin film transistor connected to the gate line and the data line; and
a passivation layer on the gate line, the data line and the thin film transistor, wherein the passivation layer comprises a recessed portion.

7. The display device as claimed in claim 6, wherein at least one of the main column spacer and the sub-column spacer overlaps the thin film transistor.

8. The display device as claimed in claim 6, wherein the light blocking portion is disposed only on the recessed portion of the passivation layer.

9. The display device as claimed in claim 6, wherein the recessed portion has a depth in a range of about 10% to about 200% of a thickness of the light blocking portion.

10. The display device as claimed in claim 6, wherein at least a portion of the recessed portion overlaps at least one of the gate line and the data line.

11. The display device as claimed in claim 6, wherein the passivation layer is disposed between the light blocking portion and the first, second color filter.

12. The display device as claimed in claim 6, wherein the main column spacer and the sub-column spacer overlaps the recessed portion in a plan view.

* * * * *